United States Patent [19]

Witonsky et al.

[11] 3,952,597

[45] Apr. 27, 1976

[54] DISPOSABLE FOOD THERMOMETER

[75] Inventors: Robert J. Witonsky, Princeton; Raymond P. Larsson, Danville, both of N.J.

[73] Assignee: Bio-Medical Sciences, Inc., Fairfield, N.J.

[22] Filed: Nov. 8, 1974

[21] Appl. No.: 522,222

[52] U.S. Cl. .................... 73/371; 73/352; 73/368.3; 116/114.5; 264/230
[51] Int. Cl.² ............... G01K 5/32; B29B 3/00; G01K 1/14
[58] Field of Search .............. 73/352, 358, 368.3, 73/371; 116/114.5; 264/230

[56] References Cited
UNITED STATES PATENTS

| | | | |
|---|---|---|---|
| 2,841,983 | 7/1958 | Vernet | 73/358 |
| 2,906,123 | 9/1959 | Vernet et al. | 73/368.3 |
| 3,597,372 | 8/1971 | Cook | 264/230 X |
| 3,631,721 | 1/1972 | Nollen et al. | 73/368.3 |
| 3,726,141 | 4/1973 | Bremer | 73/368.3 |

Primary Examiner—Richard C. Queisser
Assistant Examiner—Frederick Shoon
Attorney, Agent, or Firm—Anthony Lagani, Jr.

[57] ABSTRACT

A disposable type cooking thermometer having a reservoir for holding a fluid, an indicator means, and a capillary tube or channel connecting the reservoir with the indicator means. The reservoir is made from a material which shrinks from an initial size at ambient temperatures to some smaller size when exposed to cooking temperatures. As the reservoir progressively shrinks during cooking, fluid is expelled therefrom thru the capillary tube or channel and onto the indicator means to denote the degree of cooking achieved in the foodstuff in which the thermometer has been inserted.

14 Claims, 5 Drawing Figures

U.S. Patent   April 27, 1976   3,952,597
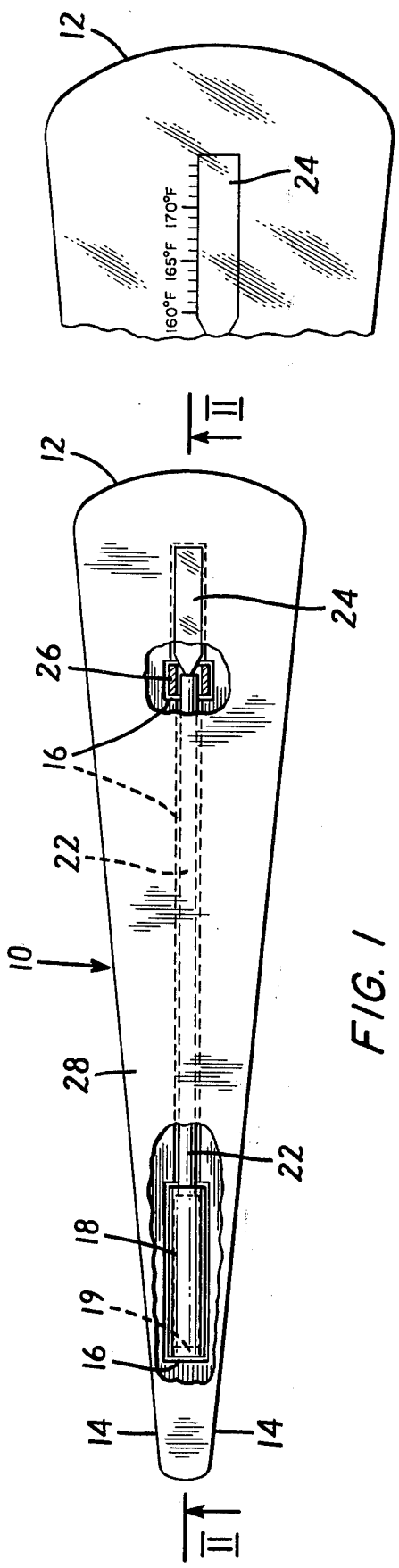
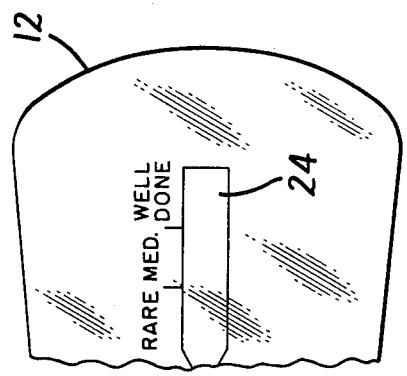
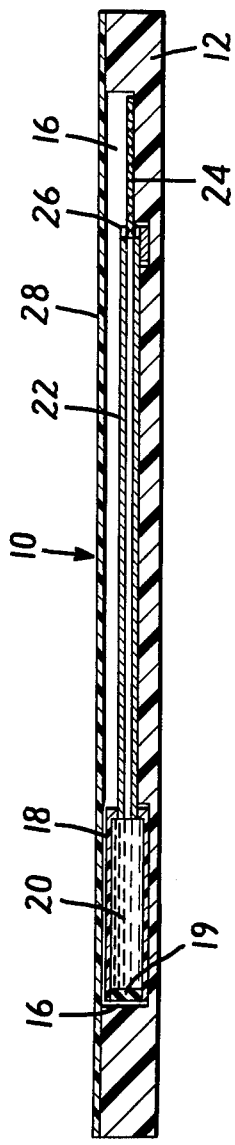
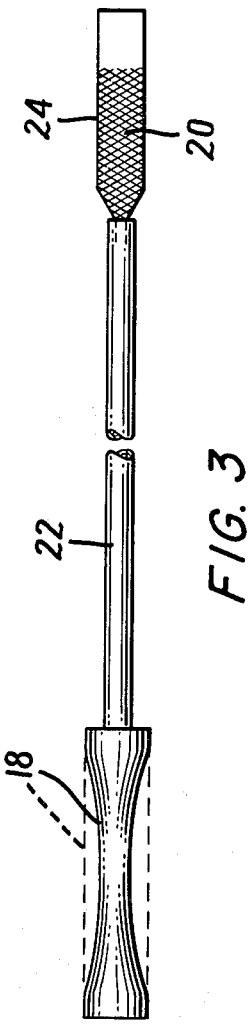

DISPOSABLE FOOD THERMOMETER

BACKGROUND OF THE INVENTION

Various types and constructions of thermometers are known for use in conjunction with the cooking of foodstuffs. As is a common practice in using such devices with meats and poultry, the device is inserted in the foodstuff so that upon attainment of a particular cooking temperature within the foodstuff, the thermometer indicates such event to the user. While such thermometer types as are known are quite suited for their intended purposes, such thermometers are relatively expensive to make, a fact which militates against their use as a convenient, single use throw-away temperature indicator.

SUMMARY OF THE INVENTION

The present invention relates to a thermometer intended for use with foodstuffs to indicate the degree of cooking to which a foodstuff has been subjected. An expecially advantageous use of the thermometer is as a single use, disposable temperature indicator for indicating the degree of cooking effected to meats and poultry. The thermometer functions with a high degree of accuracy to indicate particular foodstuff temperatures during the course of cooking, and is of relatively inexpensive construction so as to permit disposal of the same following a single use thereof. It further has the advantage of rapidly cooling following removal of the same from the foodstuff and oven thereby greatly facilitating handling by the user. The thermometer because of its attributes of simple construction and low manufacturing cost readily can be included in a meat or poultry item package at the time of sale of the foodstuff. In this manner a thermometer is readily available for use when cooking the foodstuff.

In accordance with the present invention the thermometer includes a reservoir such as an elongated tubular member which is plugged at one end and which has a volumetric capacity of predetermined value at ambient temperatures, the reservoir normally being filled to its capacity with a suitable fluid. The thermometer also includes capillary means and an indicator means with the capillary means being connected at one end in communication with the reservoir and at the other end being connected in communication with the indicator means. Conveniently the reservoir, capillary means and indicator means can be mounted on an elongated support of a suitable material, as for example, Nylon. In a preferred form, the support is provided with an elongated slotted recess in which the aforementioned components are received. The reservoir further is characterized by being made of a material which has the property of undergoing shrinkage when heated from an ambient temperature to temperatures which are associated with the cooking of foodstuffs. Thus when so heated, the volumetric capacity of the reservoir is caused to reduce from the predetermined value to a lesser volumetric capacity with the reduction of the volumetric capacity of the reservoir being effective to expel fluid from the reservoir through the capillary tube and onto the indicator means. One form of material which is satisfactory for use as the reservoir is polytetraflouroethylene shrink-fit tubing. As those skilled in the art will appreciate, this material has the desirable property of shrinking when heated to temperatures in a foodstuff cooking range so that by forming the reservoir of this material it is possible to employ the shrinking as a pumping action to expel fluid from the reservoir at a rate which is related to the cooking temperature of the foodstuff. By selecting a shrink tube component and a capillary tube of requisite sizes it is possible when used in conjunction with a selected indicator to provide a thermometer which gives a read-out only after the minimum safe temperature of cooking has been reached.

In accordance with the present invention, the indicator means can be any one of a number of suitable indicator media as are known to those skilled in the art. For example the indicator can comprise a layer of microcrystaline cellulose onto which the fluid in the thermometer is expelled during the course of cooking, with the extent to which the indicator becomes wetted by the fluid reflecting the degree of cooking occurring in the foodstuff.

The fluid which fills the reservoir and which ultimately is expelled onto the indicator means is one which exhibits the properties of remaining fluid at the temperatures involved in cooking a foodstuff as well as being innocuous in effect on humans.

The thermometer of the present invention is such as to function independently of the size of the foodstuff with which it is used as well as cooking oven temperature. In a particularly advantageous application, the thermometer is used to denote the degree of cooking to which a poultry foodstuff, that is, a turkey has been subjected. As those skilled in the art know, a turkey regardless of size and if filled with stuffing will have been cooked to an acceptable degree of cooking when the temperature of the stuffing reaches 160°F. Thus when used with a turkey, the thermometer is inserted in the stuffing.

The invention accordingly comprises the improved thermometer possessing the features, properties and relation of elements which will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals indicate like parts throughout and in which:

FIG. 1 is a plan view of a thermometer constructed in accordance with the principles of the present invention, portions thereof being broken away for purposes of clarity in depicting constructional details of the thermometer.

FIG. 2 is a vertical sectional view as taken along the line II—II in FIG. 1.

FIG. 3 is a schematic depiction on slightly enlarged scale of the manner in which the thermometer of the present invention functions during the progressive shrinking of the reservoir to provide indication of foodstuff cooking temperature.

FIGS. 4 and 5 are fragmentary plan views of the indicating end of the thermometer device of the present invention showing alternative forms of indicia which can be provided thereon and associated with the indicating layer to denote various degrees of cooking of the foodstuff.

DESCRIPTION OF THE PREFERRED EMBODIMENTS

The present invention is concerned with an improved form of thermometer and particularly one which can be utilized in connection with the cooking of foodstuffs such as meats and poultry. The thermometer is simply and economically constructed and lends itself to a single use thus making it readily adaptable for incorporation in the package with which the foodstuff is sold. Thus for example the thermometer can be provided in a fresh frozen turkey package. While the ensuing description will be given primarily with respect to a thermometer as would be used in connection with the cooking of a turkey in which instance the thermometer would be inserted in the stuffing conventionally prepared and used with such foodstuff it will be evident that the thermometer has broader applicability to the cooking of a wide range of meat and poultry products.

Referring now to FIGS. 1 and 2, the thermometer 10 includes an elongated generally flat support 12 having opposed faces and which can be contoured as depicted to facilitate the insertion of the device in the stuffing pocket of a turkey, for example the device being provided with a converging planar outline as at 14 for that purpose, the support desirably being provided from a resilient material, as for example, Nylon. Nylon is relatively inexpensive, is easy to shape and is available in forms which are innocuous in respect of its effect in a foodstuff. The support 12 can be provided with an elongated slotted recess 16 extending inwardly from one face surface and in which is received in longitudinal disposition the thermometer components to be described now.

The thermometer also includes a reservoir 18 received at one end of recess 16 and which in one advantageous form is provided as an elongated tubular component of polytetraflouroethylene, the polytetraflouroethylene being of a type which has the property of shrinking from its size at ambient temperatures to some smaller size when exposed to the elevated temperatures associated with cooking foodstuffs, shrinking of the tube of the material described below starting at about 105°–110°F. A particularly suitable material is COMCO TEFLON FEP trademark tubing with a shrinkable polytetraflouroethylene tubing sold by Commercial Plastics & Supply Corporation, of Cromwell Heights, Pa. The reservoir 18 has a volumetric capacity of predetermined value at ambient temperatures and desirably is blocked with a plug 19 at one end. The reservoir 18, which in the depicted embodiment is one inch long and has a 0.060 inch inside diameter and ASTM designation 18 AWG outside diameter serves to hold a predetermined amount of fluid 20 (about 60–70 microliters) for the purposes as will be described shortly. The thermometer also includes a capillary tube 22 which is connected at one end in communication with the reservoir 18 and which at its other end communicates with an indicator means shown generally at 24, the thermometer being provided with a semi-annular bushing 26 in which is received the last-mentioned end of said capillary tube 22 and a tip end portion of the indicator means 24. In the depicted thermometer, the capillary tube is made of metal, e.g., stainless steel or glass of 0.060 inch outside diameter and 0.007 inch inside diameter.

Overlaying one face of the thermometer 10 is a film 28 of a synthetic polymeric material such as Mylar, which film optionally can be transparent or which could be of opaque character except for a section thereof overlaying the indicator 24 which section would be transparent to provide a read-out window.

Under ambient non-cooking conditions, the reservoir 18 will be filled with fluid 20. Such fluid which is selected for its character of remaining liquid under the elevated temperature conditions to which the device is subjected in a cooking oven as well as the innocuous effect of the same with respect to foodstuffs, can include glycerol, propylene glycol, glycerol dioleate and glycerol distearate although other materials also can be used. As used herein "fluid" is also inclusive of materials which are normally solid at ambient temperatures but which at temperatures approaching foodstuff cooking temperatures change state from solid to liquid state, e.g., a solid which becomes liquid at about 130°F.

Indicator means 24 can be provided from any suitable absorbent material which permits transmission of the liquid therealong as by wicking when wetted by the fluid 20. In the depicted embodiment, the indicator means 24 is comprised by a layer of microcrystalline cellulose.

In use, the thermometer 10 is inserted in the foodstuff, as for example in the stuffing of a turkey. At the outset of the cooking cycle, the liquid remains in the reservoir. However at a given point during the cooking process, e.g., 105°–110°F., the reservoir will start to progressively shrink due to the shrinking property of the polytetraflouroethylene from which it is made. In shrinking, the tube will act as a pump and expel the fluid 20 therefrom until ultimately the fluid is expelled through the capillary tube 22 and on to the indicator means 24. When the fluid enters onto the indicator means 24, the temperature of the foodstuff is nearing that necessary for an acceptable cooking condition. For example, in cooking a turkey when the stuffing temperature of the turkey reaches 160°F, the turkey will have been cooked to an acceptable cooking temperature. The latter is true regardless of the size of the turkey or the oven temperature. FIG. 3 depicts the manner in which the reservoir 18 shrinks during the cooking to expel the fluid therefrom and through the capillary tube on to the indicator means. Thus it will be noted the reservoir 18 undergoes a reduction in size from that shown in dashed lines to that shown in solid lines, the decreased volume of the reservoir accounting for the volume of fluid expelled therefrom through the capillary tube and onto the indicator means, in the depicted embodiment, the reservoir having undergone a volumetric capacity reduction of about 20%. This represents a relatively large volume of fluid to handle for indicating temperatures with a thermometric device and accordingly the tolerances in a device of the invention can be less exacting than those required in conventional liquid thermometers which function on expansion.

FIGS. 4 and 5 depict alternative manners of employing indicia on the face of the thermometer structure which are associated with various degrees of cooking of the foodstuff. Thus in FIG. 4 there is shown a series of graduations corresponding to degrees of temperature and reflecting the actual temperature in the foodstuff. On the other hand, FIG. 5 indicates a series of successively longitudinally arranged zones of marking on the indicator layer in correspondence to successively increasing degrees of cooking of the foodstuff, passage of the fluid 20 to such indicia signalling visually to the user, the degree of cooking which has been achieved. To facilitate reading the travel of the fluid 20, a dyestuff can be incorporated in the fluid, e.g., FDC Red No. 2 can be used with glycerol.

It will be apparent from a reading of the foregoing that the improved cooking thermometer provided by the present invention is particularly advantageous in that it provides a manner of indicating to a user the degree to which a meat or poultry foodstuff has been cooked with convenience and accuracy. Additionally the thermometer is cheap and convenient to manufacture readily making it disposable so that it can be thrown away after a single use.

What is claimed is:

1. A disposable thermometer for use in a foodstuff to indicate the degree of cooking to which said foodstuff has been subjected comprising a reservoir having a volumetric capacity of predetermined value at ambient temperatures,
   a fluid filling said reservoir,
   capillary means, and
   indicator means,
   said capillary tube means communicating at one end with said reservoir and at the other end with said indicator means,
   said reservoir being characterized by being of a material having the property of undergoing shrinkage when heated from an ambient temperature to temperatures associated with the cooking of foodstuffs whereby the volumetric capacity of said reservoir is caused to reduce from said predetermined value to a lesser volumetric capacity, reduction of the volumetric capacity of said reservoir being effective to expel fluid from said reservoir thru said capillary tube and onto said indicator means.

2. The thermometer of claim 1 in which said reservoir is made of polytetraflouroethylene.

3. The thermometer of claim 2 in which said reservoir is a tubular member.

4. The thermometer of claim 1 in which said indicator means is a layer of microcrystalline cellulose.

5. The thermometer of claim 4 in which said indicator means layer is elongated, there being indicia associated with said layer denoting degrees of cooking of said foodstuff.

6. The thermometer of claim 5 in which said indicia comprises graduations corresponding to degrees of temperature.

7. The thermometer of claim 5 in which said indicia comprises successively longitudinaly arranged zones of marking on said layer in correspondence to successively increasing degrees of cooking of said foodstuff.

8. The thermometer of claim 1 in which said fluid is selected from one of glycerol, propylene glycol, glycerol diolete and glycerol distearate.

9. The thermometer of claim 1 in which a dyestuff is embodied in said fluid.

10. The thermometer of claim 1 further comprising an elongated relatively flat support, said reservoir, capillary tube and indicator means being disposed longitudinaly of said support.

11. The thermometer of claim 10 in which said support is provided with an elongated longitudinaly directed slotted recess at one face thereof, said reservoir, capillary tube and indicator means being received in said recess.

12. The thermometer of claim 11 in which said support is made of a resilient material.

13. The thermometer of claim 12 in which said material is Nylon.

14. The thermometer of claim 11 further comprising a film of a polymeric material overlaying said one face of said support and being fixedly secured thereto.

* * * * *